(12) United States Patent
Toyoda

(10) Patent No.: US 9,875,065 B2
(45) Date of Patent: Jan. 23, 2018

(54) INFORMATION PROCESSING DEVICE THAT EXTENDS SERVICE LIFE OF NON-VOLATILE SEMICONDUCTOR MEMORY AND RECORDING MEDIUM

(71) Applicant: KYOCERA Document Solutions Inc., Osaka (JP)

(72) Inventor: Takashi Toyoda, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 58 days.

(21) Appl. No.: 15/001,760

(22) Filed: Jan. 20, 2016

(65) Prior Publication Data

US 2016/0253097 A1    Sep. 1, 2016

(30) Foreign Application Priority Data

Feb. 27, 2015  (JP) .................................. 2015-037710

(51) Int. Cl.
*G06F 3/06* (2006.01)

(52) U.S. Cl.
CPC .......... *G06F 3/0688* (2013.01); *G06F 3/0616* (2013.01); *G06F 3/0647* (2013.01)

(58) Field of Classification Search
CPC ..... G06F 3/0688; G06F 3/0616; G06F 3/0647
USPC ........................................................ 711/103
See application file for complete search history.

(56) References Cited

U.S. PATENT DOCUMENTS

| | | | | |
|---|---|---|---|---|
| 6,516,440 B1* | 2/2003 | Teradaira | ............... | G06K 15/00 714/763 |
| 2005/0268188 A1* | 12/2005 | Kawamura | ......... | G06F 11/1471 714/723 |
| 2006/0036660 A1* | 2/2006 | Lynn | ................. | G06F 17/30008 |
| 2010/0205353 A1* | 8/2010 | Miyamoto | .......... | G06F 11/1471 711/103 |
| 2013/0227236 A1* | 8/2013 | Flynn | ..................... | G11C 16/26 711/165 |
| 2014/0310483 A1* | 10/2014 | Bennett | ................... | G06F 12/00 711/154 |
| 2016/0239228 A1* | 8/2016 | Bennett | ................... | G06F 12/00 |

FOREIGN PATENT DOCUMENTS

| | | | | |
|---|---|---|---|---|
| CA | 2058734 C | * | 6/2002 | .......... G06F 11/1076 |
| JP | 2000-35922 A | | 2/2000 | |

* cited by examiner

*Primary Examiner* — Pierre Miche Bataille
(74) *Attorney, Agent, or Firm* — Stein IP, LLC

(57) ABSTRACT

An information processing device includes a volatile memory, a non-volatile semiconductor memory, a storage circuit, and a processor. The processor records corresponding update information in a first log area when updating actual data in a first actual data area by the update data. The processor collects the update information recorded in the first log area at a specific timing. The processor writes the collected update information to a second log area. After writing the collected update information, the processor initializes the first log area. When the second log area becomes full, the processor writes the actual data in the first actual data area to the corresponding second actual data area. After writing the actual data, the processor initializes the first log area and the second log area.

5 Claims, 14 Drawing Sheets

FIG. 4

| Data ID | Update Data | Writing Count |
|---------|-------------|---------------|
| PCNT | 102 | 1 |
| PCNT | 105 | 2 |
| STAT | OK | 1 |
| ... | ... | ... |

33d

INFORMATION PROCESSING DEVICE THAT EXTENDS SERVICE LIFE OF NON-VOLATILE SEMICONDUCTOR MEMORY AND RECORDING MEDIUM

INCORPORATION BY REFERENCE

This application is based upon, and claims the benefit of priority from, corresponding Japanese Patent Application No. 2015-037710 filed in the Japan Patent Office on Feb. 27, 2015, the entire contents of which are incorporated herein by reference.

BACKGROUND

Unless otherwise indicated herein, the description in this section is not prior art to the claims in this application and is not admitted to be prior art by inclusion in this section.

To hold a small amount of data used by a device and an apparatus even during power-cutoff, a typical information processing device, especially an embedded device and a Multifunction Peripheral (MPF), has used an Electrically Erasable Programmable Read-Only Memory (EEPROM).

The EEPROM is often used as a non-volatile semiconductor memory, which saves the small amount of data on a volatile memory includes a Dynamic Random Access Memory (DRAM) or a similar memory.

For example, the following technique has been proposed as a technique to optimize a control of writing data from the volatile memory to the non-volatile semiconductor memory. Data are grouped by write timings. The technique writes only data to be written at a specific timing to the non-volatile semiconductor memory to ensure shortening time required for writing.

In advance of the writing of data in units of pages, the non-volatile semiconductor memory deletes (initializes) data in units of blocks. The number of initializations (the number of writings) has an upper limit due to the structure of the memory. Therefore, to avoid concentration of writing to a specific block, a wear leveling technology, which is to perform uniform writing, has been developed.

For example, Journaling Flash File System, version 2 (JFFS2) is provided as a file system that has a journal function optimized for a property of a NAND flash memory (registered trademark) and performs the wear leveling. JFFS2 is a file system for Linux (registered trademark) and is often used for the embedded device.

SUMMARY

An information processing device according to an aspect of the disclosure includes a volatile memory, a non-volatile semiconductor memory, a storage circuit, and a processor. The volatile memory includes a first actual data area and a first log area. The first actual data area records actual data. The first log area records update information including update data. The update data is for updating the actual data recorded in the first actual data area. The non-volatile semiconductor memory includes a plurality of blocks and a second actual data area. At writing of the actual data, the non-volatile semiconductor memory is initialized in units of the blocks. The second actual data area records the actual data in units of the blocks. The storage circuit includes a second log area to which the update information recorded in the first log area is wrote. The processor records corresponding update information in the first log area when updating the actual data in the first actual data area by the update data. The processor collects the update information recorded in the first log area at a specific timing. The processor writes the collected update information to the second log area. After writing the collected update information, the processor initializes the first log area. When the second log area becomes full, the processor writes the actual data in the first actual data area to the corresponding second actual data area. After writing the actual data, the processor initializes the first log area and the second log area.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates an exemplary configuration of update information recorded in a log recording area according to the embodiment;

DETAILED DESCRIPTION

Figure 1:
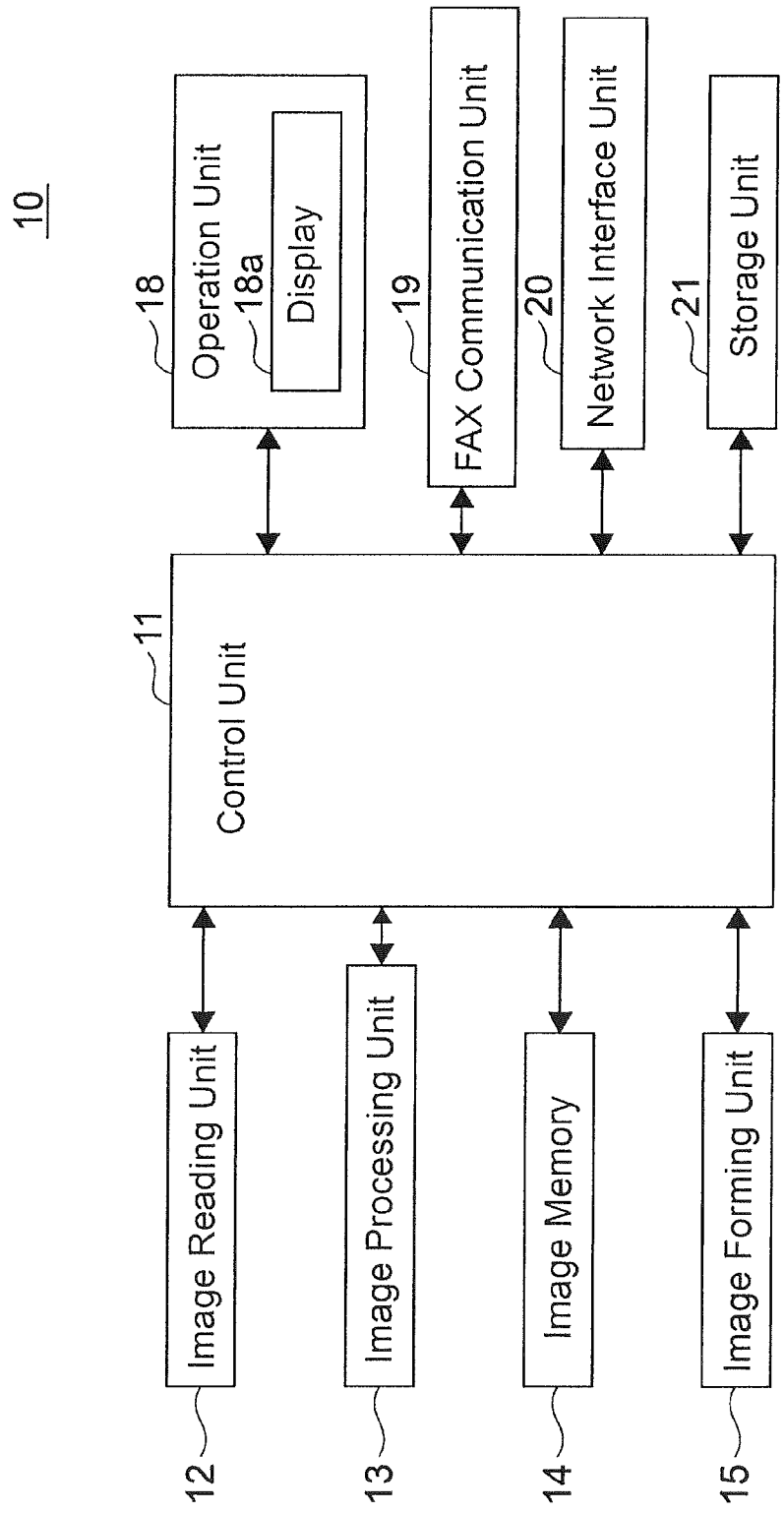
FIG. 1 illustrates a configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings. The following describes a control unit of an image forming apparatus as an example of an information processing device according to the disclosure. As an example of a non-volatile semiconductor memory whose number of writings is limited and on which initialization is performed in units of blocks, this embodiment mainly assumes an EEPROM. The following gives a description with this non-volatile semiconductor memory as the EEPROM.

First Embodiment (Configuration of Image Forming Apparatus)

First, the following describes a configuration of the image forming apparatus according to an embodiment of the disclosure. FIG. 1 illustrates a configuration of an image forming apparatus 10 according to an embodiment of the disclosure.

The image forming apparatus 10 includes a control unit 11 (an information processing device). The control unit 11 manages the entire operation control of the image forming apparatus 10. The configuration of the control unit 11 will be described later.

The control unit 11 is connected to an image reading unit 12, an image processing unit 13, an image memory 14, an image forming unit 15, an operation unit 18, a facsimile communication unit 19, a network interface unit 20, a storage unit 21 (also referred to as a storage circuit), and a similar unit. The control unit 11 performs operation controls of the respective connected units (blocks) and transmits and receives signals or data between the respective blocks.

The control unit 11 controls a driving and process of a mechanism required to perform an operation control on each function, such as a scanner function, a printing function, a copy function, and a facsimile transmission/reception function, based on an execution instruction of a job input by a user via the operation unit 18, a network-connected PC, or a similar unit.

The image reading unit 12 reads images from documents.

The image processing unit 13 performs image processing on the image data of the image read by the image reading unit 12 as necessary. For example, to improve the quality after image formation of the image read by the image reading unit 12, the image processing unit 13 performs image processing such as shading correction.

The image memory 14 has an area that temporarily stores the data of the document image obtained by reading by the image reading unit 12 and temporarily stores the data as a print target by the image forming unit 15.

The image forming unit 15 performs image formation of the image data read by the image reading unit 12 or a similar image.

The operation unit 18 includes a touch panel unit and an operation key unit, which accept instructions from the user regarding various operations and processes executable by the image forming apparatus 10. The touch panel unit includes a display 18a such as a Liquid Crystal Display (LCD) provided with a touch panel.

The facsimile communication unit 19 includes an encoding/decoding unit, a modulation/demodulation unit, and a Network Control Unit (NCU). The facsimile communication unit 19 performs facsimile transmission using a dial-up network.

The network interface unit 20 includes a communication module such as a LAN board. The network interface unit 20 transmits and receives various data to/from a device in a local area (an external device such as a server and a PC) via the LAN or a similar medium connected to the network interface unit 20.

The storage unit 21 stores a document image read by the image reading unit 12 or a similar image. The storage unit 21 is also used as an area to store update information, which will be described later. The storage unit 21 is a large-capacity storage device such as a Hard Disk Drive (HDD) or a Solid State Drive (SSD). This embodiment mainly assumes the HDD, which has no limitations on the number of writings.

The configuration of the image forming apparatus 10 according to an embodiment of the disclosure is described above.

Configuration of Control Unit

Figure 2:
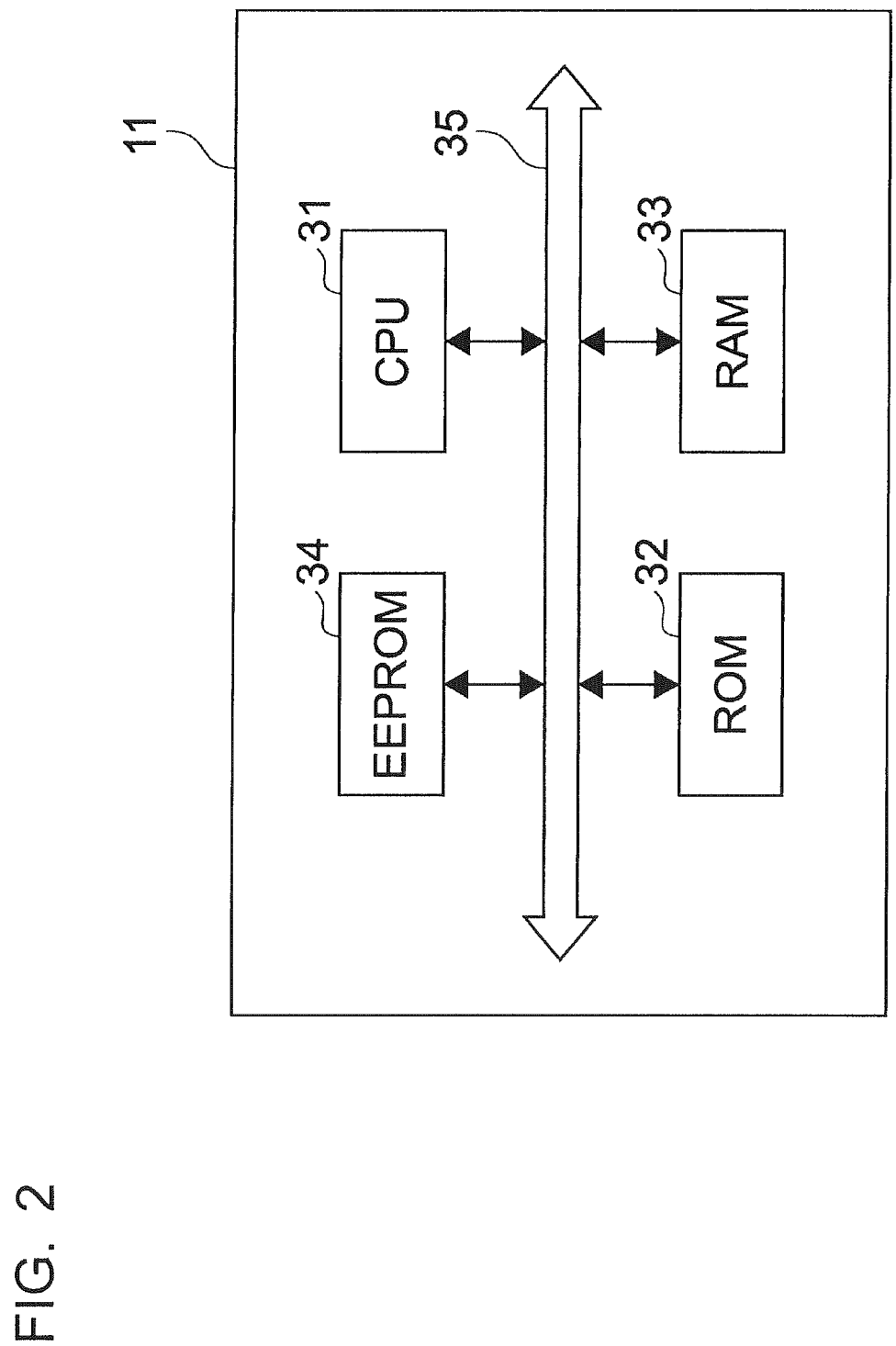
FIG. 2 illustrates a configuration of a control unit according to an embodiment.

The following describes the configuration of the control unit 11. FIG. 2 illustrates the configuration of the control unit 11.

As illustrated in FIG. 2, the control unit 11 includes a Central Processing Unit (CPU) 31, a Read Only Memory (ROM) 32, a Random Access Memory (RAM) 33, and an EEPROM 34. These blocks are each connected via a bus 35. The internal configurations of the RAM 33 and the EEPROM 34 will be described later.

The ROM 32 fixedly stores a plurality of programs such as firmware and data for executing various processes. The RAM 33 is used as a working area for the CPU 31 and temporarily holds an Operating System (OS), various applications during execution, and various data during processing.

The EEPROM 34 is a non-volatile semiconductor memory that requires initialization in units of blocks prior to the writing of data and has a limit in the number of initializations.

The CPU 31 is a processor that appropriately controls the respective units according to programs stored in the ROM 32 and the storage unit 21.

The configuration of the control unit 11 is described above.

Configuration of RAM

Figure 3:
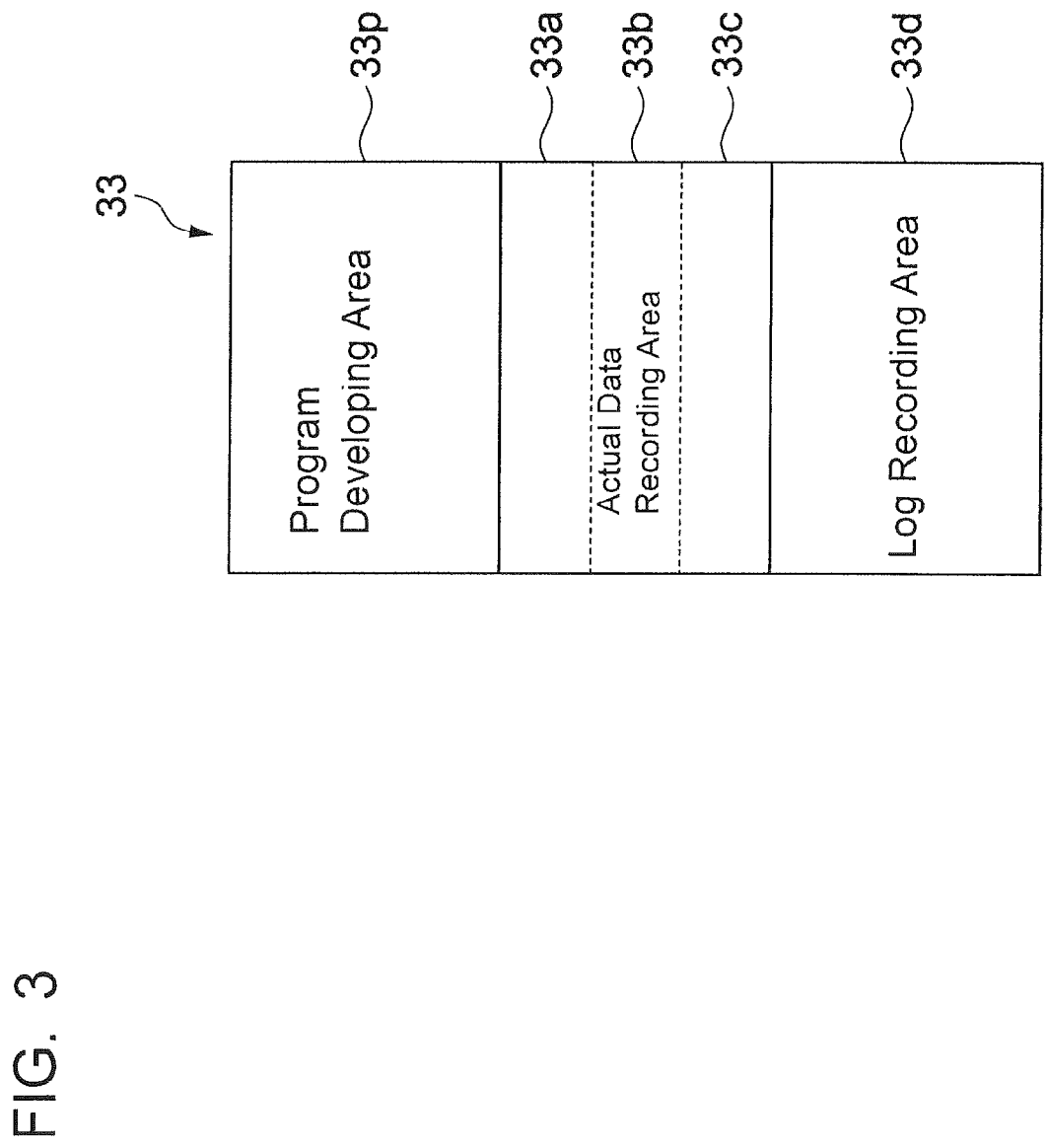
FIG. 3 illustrates an exemplary configuration of a RAM according to the embodiment.

The following describes the configuration of the RAM 33. FIG. 3 illustrates an exemplary configuration of the RAM 33.

As illustrated in FIG. 3, the RAM 33 is divided into a program developing area 33p, actual data recording areas 33a, 33b, and 33c (first actual data areas), and a log recording area 33d (a first log area, described later). In the program developing area 33p, the program executed by the CPU 31 is developed. The program developing area 33p is used as a working memory during execution of the program. The actual data recording areas 33a, 33b, and 33c hold values of variables used for the programs. The area may be logically divided or may be physically divided.

The actual data recording areas are configured of three areas; however, this is merely an example. The actual data recording areas may be configured of any given areas.

For example, assume that, a variable name of a print counter, which counts the number of printed sheets by the image forming apparatus 10, is set to PCNT, the actual data recording area 33a is used to hold a PCNT value, and the number of printed sheets up to the present is 100. In this case, the actual data recording area 33a holds a value "100."

When the image forming apparatus 10 has printed two paper sheets and the value of the print counter PCNT in the actual data recording area 33a changes from "100" to "102", the CPU 31 records the update information, such as "PCNT, 102,1", in the log recording area 33d.

The update information recorded in the log recording area 33d includes update data ("102" in the above example) used for update. The update information includes three items: a data ID, update data, and a writing count. The writing count is a counter indicative of the number of data updates after performing a refresh process (described later).

Even if the log recording area 33d stores the plurality of pieces of update information with the data ID "PCNT", by selecting the largest writing counter value, the CPU 31 ensures knowing the latest update value of the variable PCNT.

For example, assume that the image forming apparatus 10 performs printing of three more sheets. The value of the print counter PCNT in the actual data recording area 33a changes from "102" to "105." In the log recording area 33d, subsequent to the first line entry, "PCNT,102,1", an entry, "PCNT, 105,2" is additionally written (see FIG. 4).

FIG. 4 shows that, as the third line entry, for example, the value "OK" has been written to a variable STAT as the first update data. The variable STAT indicates the state of the image forming apparatus 10 and is held in the actual data recording area 33c.

For easy understanding of description, in the above description, the one actual data recording area 33a holds only one value of the variable print counter PCNT. However, actually, the configuration is not limited to this. The one actual data recording area may hold a plurality of variable values.

The information processing device according to the disclosure assumes a control unit such as the embedded device. The respective variable names (data IDs) of, for example, counters, data lengths of the variables, memory addresses where data are held, or similar information can be preliminary grasped by the designer of the device and be determined.

The program developing area 33p is not the gist of the disclosure. Therefore, the following omits the description of this part and shows the part by illustration.

The configuration of the RAM 33 is described above.
Configuration of EEPROM 34

Figure 5:
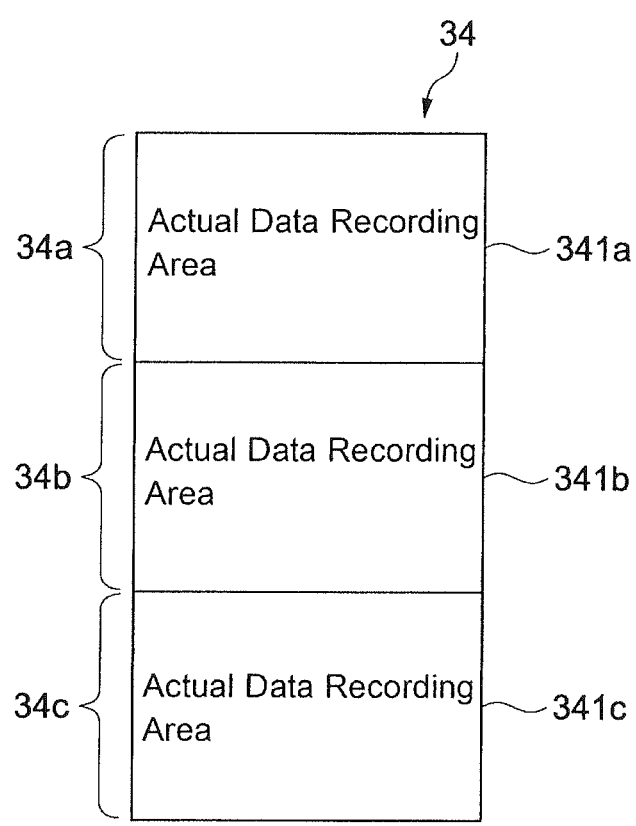
FIG. 5 illustrates an exemplary configuration of an EEPROM according to the embodiment.

The following describes the configuration of the EEPROM 34. FIG. 5 illustrates the exemplary configuration of the EEPROM 34.

In the example of FIG. 5, the EEPROM 34 includes three blocks 34a, 34b, and 34c. To write data to the EEPROM 34, prior to the writing, initialization in units of the blocks is required. The number of initializations is limited.

The block 34a includes an actual data recording area 341a (a second actual data area).

The block 34b includes an actual data recording area 341b (a second actual data area).

The block 34c includes an actual data recording area 341c (a second actual data area).

The three areas may be logically divided or may be physically divided.

The actual data recording area 341a records data corresponding to the content in the actual data recording area 33a.

The actual data recording area 341b records data corresponding to the content in the actual data recording area 33b.

The actual data recording area 341c records data corresponding to the content in the actual data recording area 33c.

That is, the capacities of the actual data recording area 33a, the actual data recording area 33b, and the actual data recording area 33c and the capacities of the actual data recording area 341a, the actual data recording area 341b, and the actual data recording area 341c may be identical.

The configuration of the EEPROM 34 is described above.
Configuration of Storage Unit 21

Figure 6:
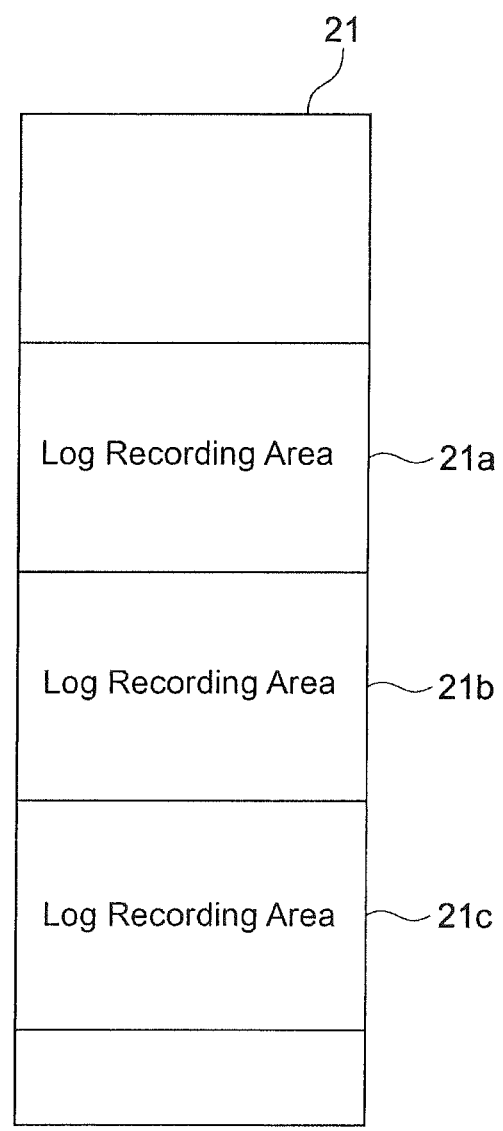
FIG. 6 illustrates an exemplary configuration of a storage unit according to the embodiment.

The following describes the configuration of the storage unit 21. FIG. 6 illustrates the exemplary configuration of the storage unit 21. The storage unit 21 ensures storing various pieces of information as described above. However, the following gives only the description related to areas storing the update information.

The storage unit 21 includes log recording areas 21a, 21b, and 21c (second log areas) as areas to store the update information.

The log recording areas 21a, 21b, and 21c record the update information as well as the areas illustrated in FIG. 4. A method for recording the update information to the log recording areas 21a, 21b, and 21c will be described later.

Here, the following should be noted. For example, when the actual data recording area 33a is assigned to hold the value of the print counter PCNT, the actual data recording area 341a is also assigned to hold the value of the print counter PCNT. However, the log recording area 21a does not always record the update information on the print counter PCNT. The update information of the variable STAT, which represents the state of the image forming apparatus 10, is possibly recorded.

The capacities of the log recording areas 21a, 21b, and 21c are each may be larger than the capacity of the log recording area 33d.

Figure 7:
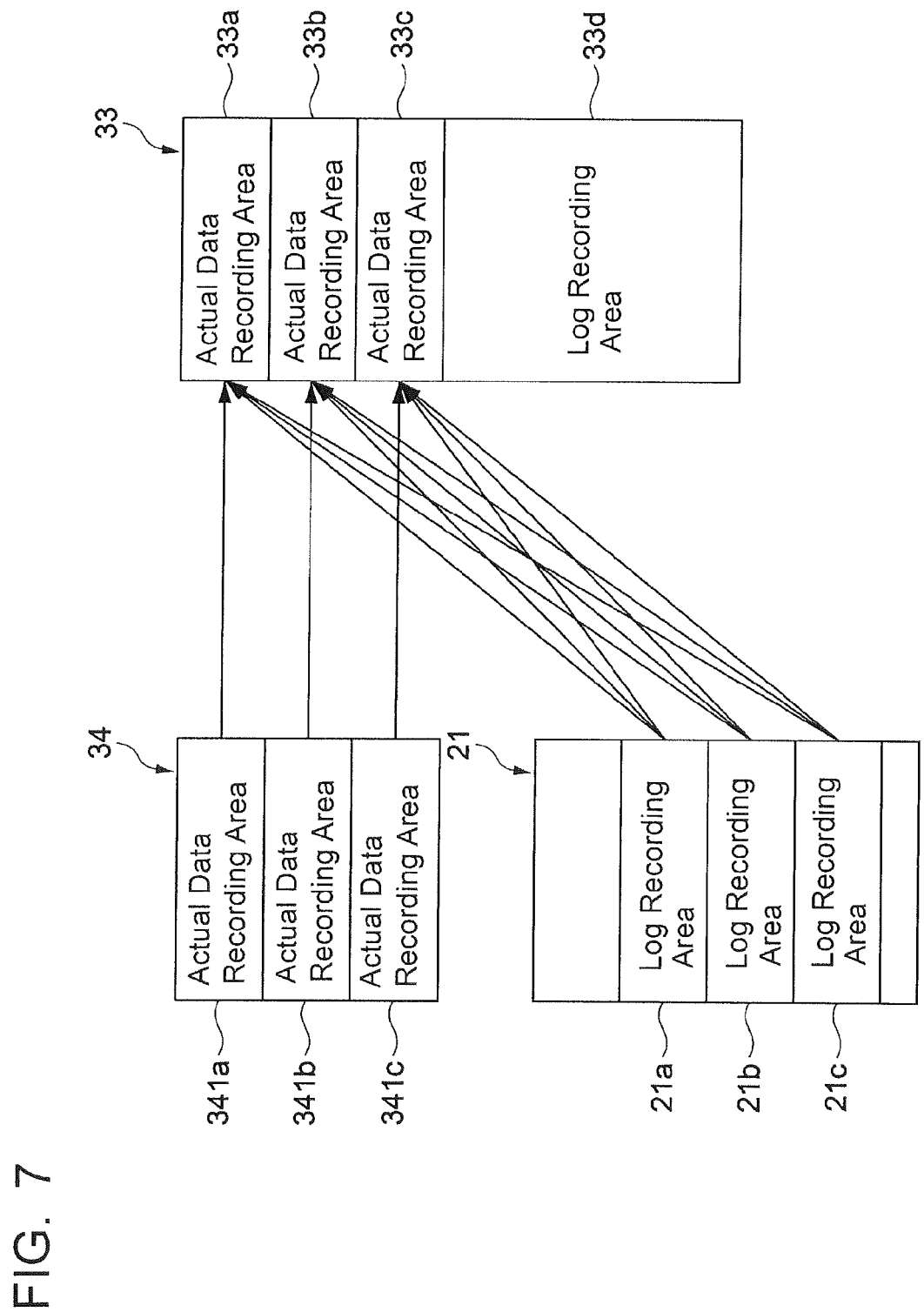
FIG. 7 illustrates a flow of data processes between the EEPROM, the storage unit, and the RAM when starting an image forming apparatus according to the embodiment.

The configuration of the storage unit 21 is described above.
Flow of Processes at Start The following describes the flow of data processes between the EEPROM 34, the storage unit 21, and the RAM 33 when starting the image forming apparatus 10. FIG. 7 illustrates the flow of data processes between the EEPROM 34, the storage unit 21, and the RAM 33 when starting the image forming apparatus 10.

First, before starting the image forming apparatus 10, the RAM 33 does not store data. The EEPROM 34 and the storage unit 21 store all data (the actual data and the update information).

For example, the actual data recording area 341a stores the value of the print counter PCNT, "100." The log recording area 21b stores the update information of the print counter PCNT, "PCNT,102,1." Similarly, the log recording area 21c stores the update information "PCNT,105,2."

At the start of the image forming apparatus 10, after initialization of the RAM 33, first, contents of the respective actual data recording area 341a, actual data recording area 341b, and actual data recording area 341c are copied to the corresponding actual data recording areas 33a, 33b, and 33c.

Afterwards, among the update information recorded in the log recording area 21a, the log recording area 21b, and the log recording area 21c, the latest data is overwritten on the data in the actual data recording areas 33a, 33b, and 33c.

By the above-described processes, the actual data recording areas 33a, 33b, and 33c in the RAM 33 hold the latest actual data.

The flow of data processes between the EEPROM 34, the storage unit 21, and the RAM 33 when starting the image forming apparatus 10 is described above.

Flow of Update Process of Actual Data on RAM

Figure 8:
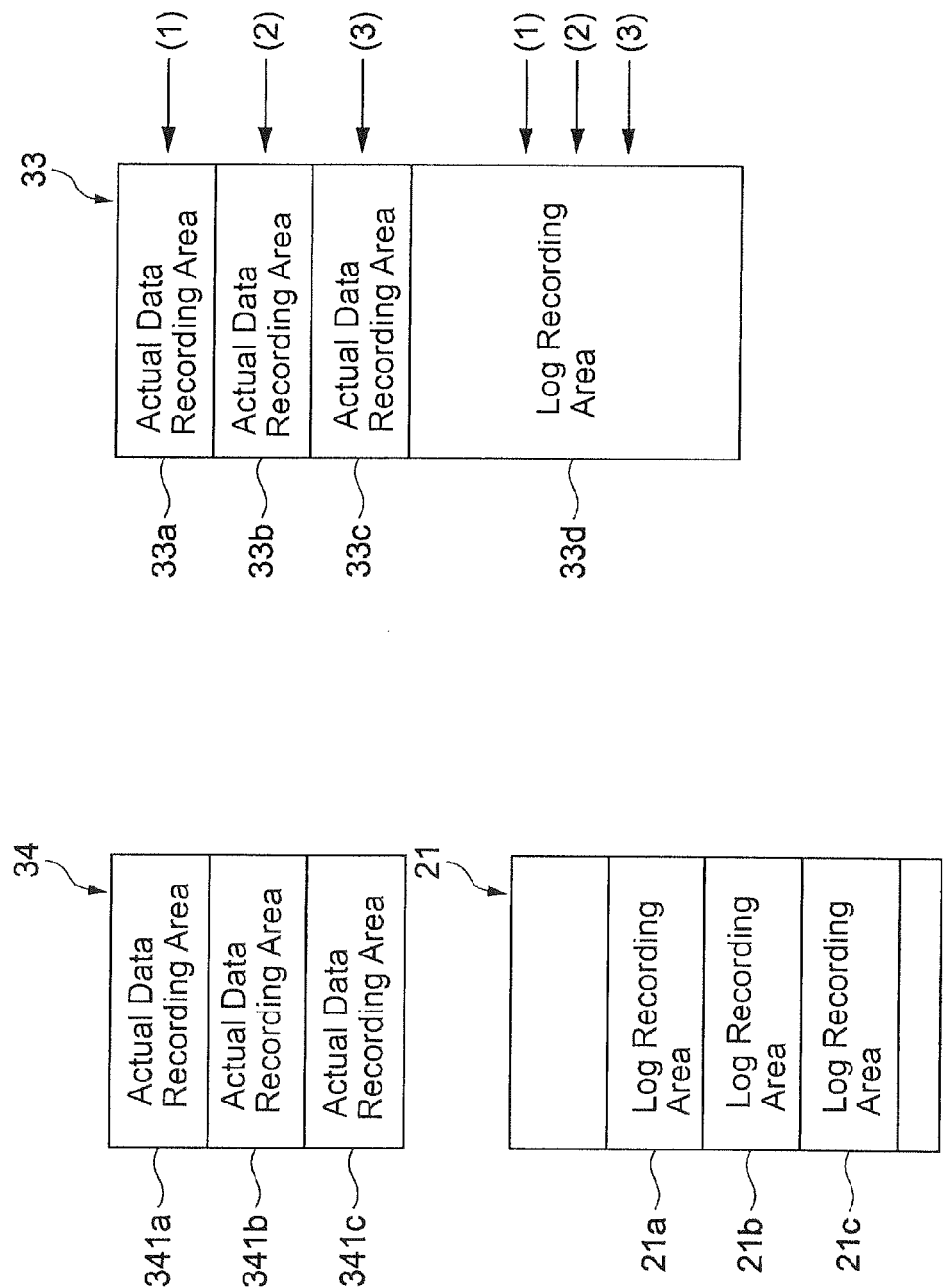
FIG. 8 illustrates a flow of processes when a CPU updates actual data on the RAM according to the embodiment.

The following describes the flow of processes when the CPU 31 updates the actual data on the RAM 33. FIG. 8 illustrates the flow of processes when the CPU 31 updates the actual data on the RAM 33.

For example, when the value of the print counter PCNT on the actual data recording area 33a is updated from "100" to "102", as described above, the log recording area 33d records the update information, "PCNT, 102, 1." FIG. 8 (1) illustrates these processes.

Thus, whenever the update process is performed on any actual data in the actual data recording areas 33a, 33b, and 33c, the update information is additionally recorded in the log recording area 33d. FIGS. 8 (1), (2), and (3) illustrate these processes.

The processes in association with the update of actual data usually terminate only the update to the RAM 33. The writing process is not performed on the EEPROM 34 and the storage unit 21.

The writing to the EEPROM 34 is not performed whenever the RAM 33 is updated. This ensures reducing the number of writings to the EEPROM 34, ensuring extending the service life of the EEPROM 34.

The writing to the storage unit 21 is not performed whenever the RAM 33 is updated. This ensures reducing time required for the writing to the storage unit 21, ensuring improving a process efficiency of the CPU 31.

The flow of processes when the CPU 31 updates the actual data on the RAM 33 is described above.

Flow of Writing Process to Storage Unit 21

Figure 9:
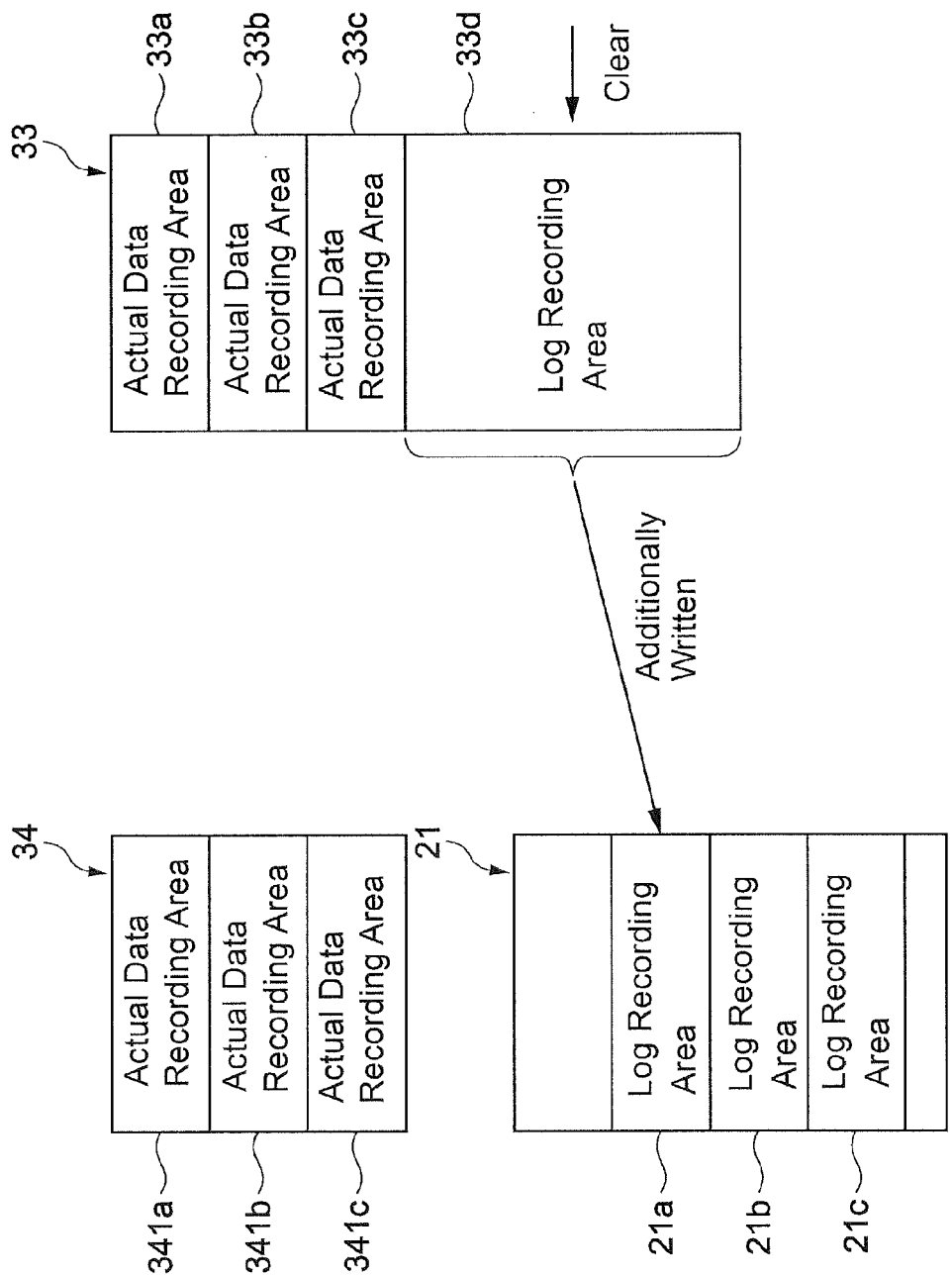
FIG. 9 illustrates a flow of processes when the storage unit according to the embodiment stores data on the RAM at a specific timing.

The following describes the flow of processes when the data on the RAM 33 is written to the EEPROM 34 at a specific timing. FIG. 9 illustrates a flow of processes when the storage unit 21 stores data on the RAM 33 at a specific timing.

Here, the specific timing means periodical timings using a timer as a trigger, cases where a batch-write instruction is executed at shut down of the image forming apparatus 10 or a similar timing, where certain specific actual data is updated, where the log recording area 33d becomes full, or a similar case.

First, when the specific timing comes, the CPU 31 collects the update information in the log recording area 33d. The CPU 31 writes the collected update information to any of the log recording areas 21a, 21b, and 21c on the storage unit 21. At the writing, the data is written so as to be additionally written to the already-written update information.

The order of writing to the log recording area 21a, 21b, or 21c is predetermined. For example, data may be circulatory written like: writing to the log recording area 21a and then writing to the log recording areas 21b and 21c. After that, returning to the start, writing to the log recording area 21a is performed.

To write the collected update information, if all the update information is not written to a certain log recording area, the remaining update information is written to the log recording area used for the subsequent writing.

After completion of writing, the CPU 31 clears (deletes) the update data in the log recording area 33d.

The gist of the above-described processes is as follows. The actual data is not written from the RAM 33 to the EEPROM 34. Only the collected update data is written to the specific log recording area 21a, 21b, or 21c in the storage unit 21.

The use of this configuration ensures reducing the number of writings to the EEPROM 34.

The flow of processes to cause the storage unit 21 to store the data on the RAM 33 at the specific timing is described above.

Flow of Refresh Process

Figure 10:
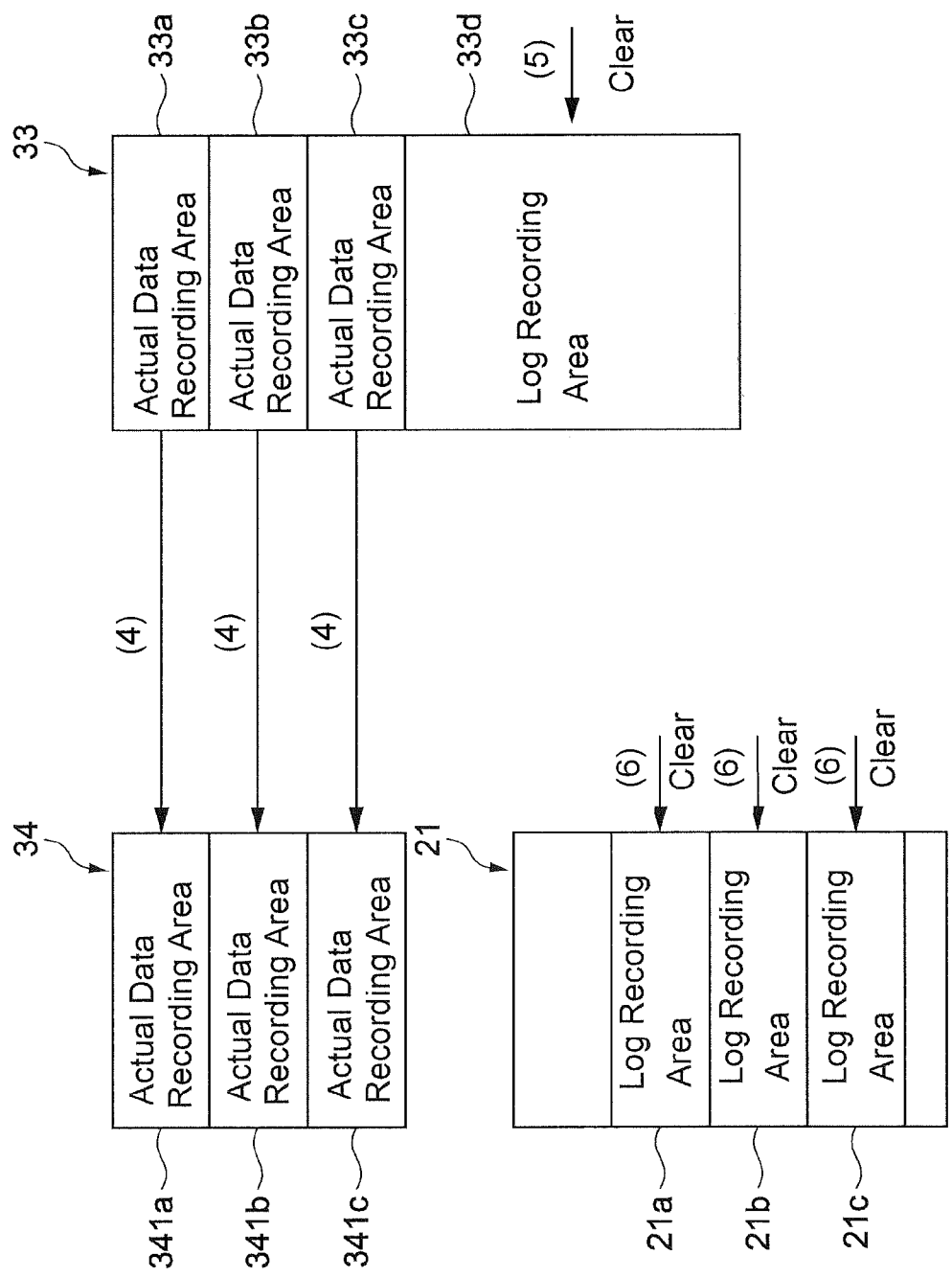
FIG. 10 illustrates a flow of a refresh process according to the embodiment.

The following describes the flow of the refresh process. FIG. 10 illustrates the flow of the refresh process.

The refresh process is a process performed in the following case. At the above-described specific timing, one log recording area in the storage unit 21 is full. Therefore, the update information recorded in the log recording area 33d is not transcribed to the full log recording area.

The refresh process overwrites the actual data in the actual data recording areas 33a, 33b, and 33c on the RAM 33 to the corresponding actual data recording area 341a, actual data recording area 341b, and actual data recording area 341c on the EEPROM 34 (illustrated in FIG. 10 (4)).

The actual data in the actual data recording areas 33a, 33b, and 33c on the RAM 33 are in the latest state. Therefore, the actual data in the actual data recording area 341a, the actual data recording area 341b, and the actual data recording area 341c on the EEPROM 34 are also in the latest state.

Therefore, the update information to configure the actual data in the latest state is unnecessary. Therefore, the update information in the log recording area 33d on the RAM 33 is cleared (illustrated in FIG. 10 (5)). The update information in the log recording area 21a, the log recording area 21b, and the log recording area 21c in the storage unit 21 are cleared (illustrated in FIG. 10 (6)).

The flow of the refresh process is described above.

Second Embodiment

The following describes an image forming apparatus 10a according to a second embodiment. The image forming apparatus 10 is partially improved in the processes performed by the control unit 11, thus configuring the image forming apparatus 10a.

The following describes two descriptions: points by which the control unit 11 can be improved and the improvement methods. The improvement methods change a part of processes performed by the control unit 11. The configuration of the image forming apparatus 10a and the configuration of the control unit 11 itself do not change. Like reference numerals designate corresponding or identical elements to those of the first embodiment, and therefore such elements will not be further elaborated here.

Point that can be Improved and Improvement Method (First)

First, the following describes the first point that can be improved and the improvement method of the image forming apparatus 10 according to the first embodiment.

For example, assume that data update to the print counter PCNT frequently occurs. Further, a timing to cause the storage unit 21 to store data has come in a state where the log recording area 33d on the RAM 33 accumulates six pieces of update information on the print counter PCNT.

Figure 11:
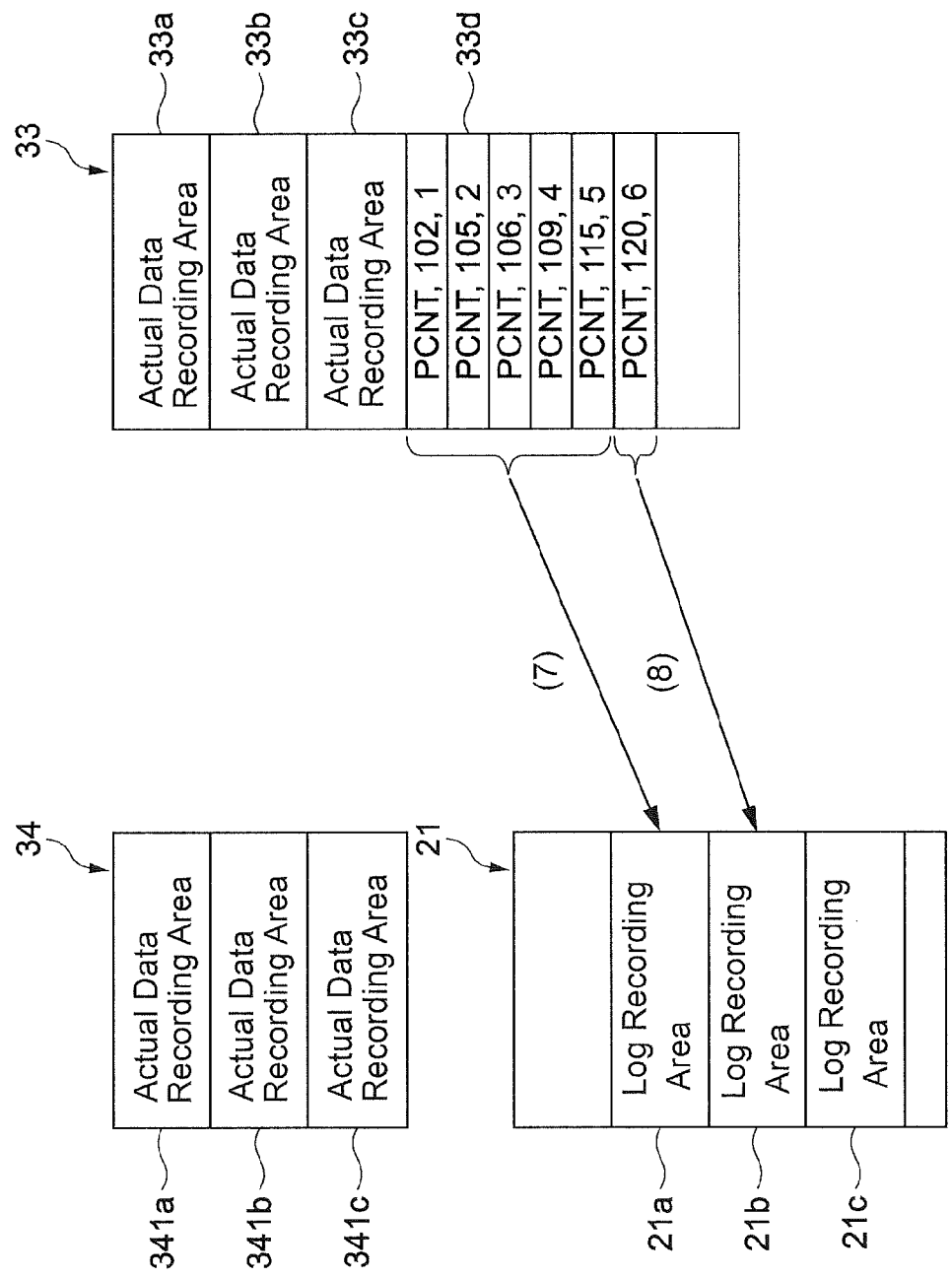
FIG. 11 illustrates a state where, if a volume of update information to be additionally written is large, all the update information is not written to one log recording area; therefore, the update information needs to be written to the subsequent log recording area.

In this case, the control unit 11 of the image forming apparatus 10 of the first embodiment has collected all update information. The control unit 11 has additionally written the collected update information in the log recording area in the storage unit 21. For example, as illustrated in FIG. 11, if the update information to be additionally written was too much, all the update information was failed to be written to one log recording area 342a (illustrated in FIG. 11 (7)). Therefore, the update information had to be written to a subsequent log recording area 342b (illustrated in FIG. 11 (8)).

Therefore, the control unit 11 of the image forming apparatus 10a of the second embodiment accommodates reducing an amount of data when causing the storage unit 21 to store the collected update information.

That is, when collecting the update information to write the update information at the specific timing from the log recording area 33d to the log recording area 21a, the log recording area 21b, or the log recording area 21c, the control unit 11 of the image forming apparatus 10a extracts only the latest update information for each data ID and collects the update information.

Figure 12:
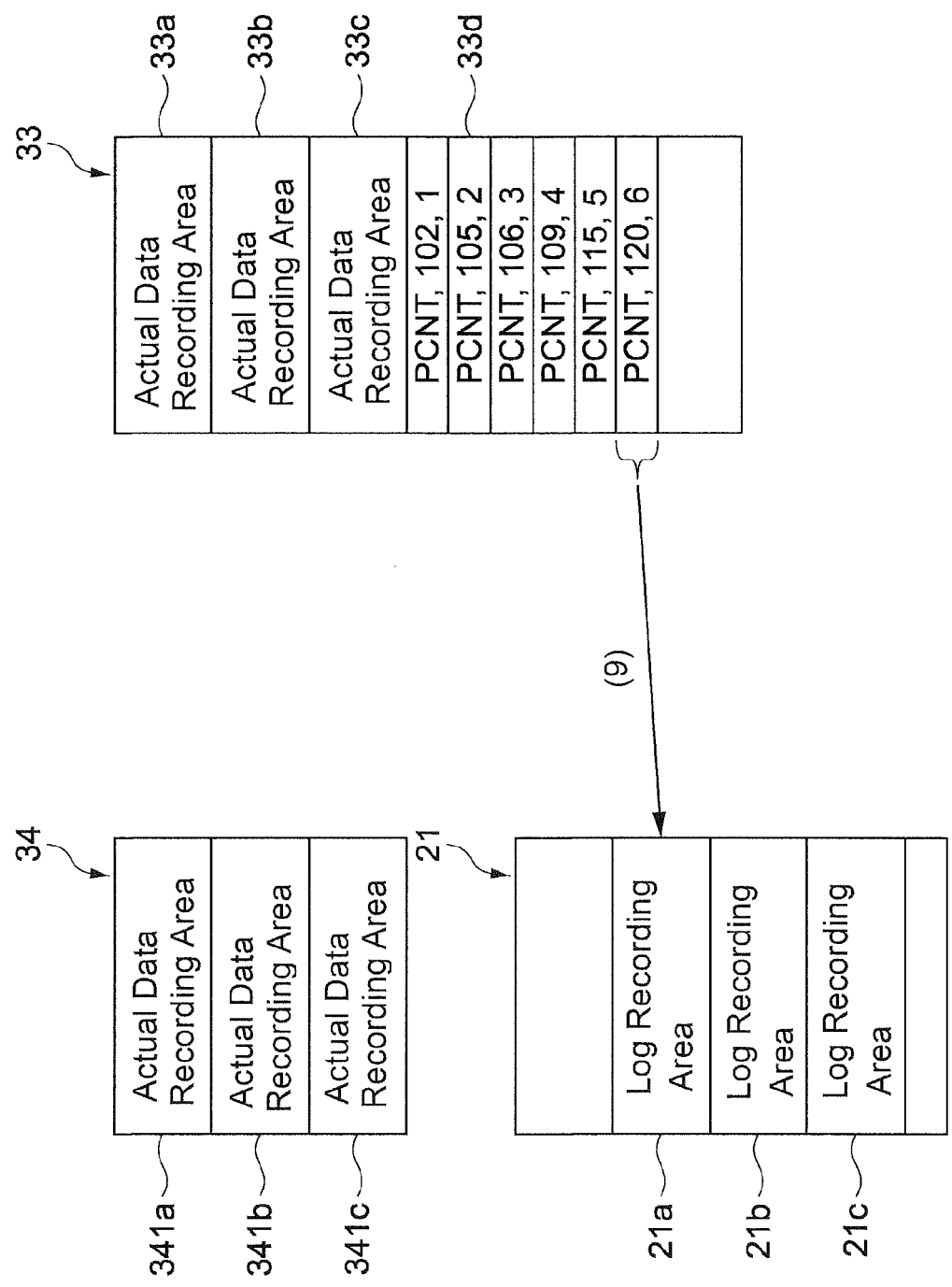
FIG. 12 illustrates a state where only latest update information is extracted with reference to a writing counter and is written to the storage unit.

For example, in the example where the above-described update information on the print counter PCNT is six pieces, referring a writing counter extracts only the latest update information among the six pieces of update information. Therefore, this example ensures reducing the update information to be stored in the storage unit 21 to one-sixth (see FIG. 12 (9)).

The first point that can be improved and the improvement method of the image forming apparatus 10 according to the first embodiment are described above.

Point that can be Improved and Improvement Method (Second)

First, the following describes the second point that can be improved and the improvement method of the image forming apparatus 10 according to the first embodiment.

Figure 13:
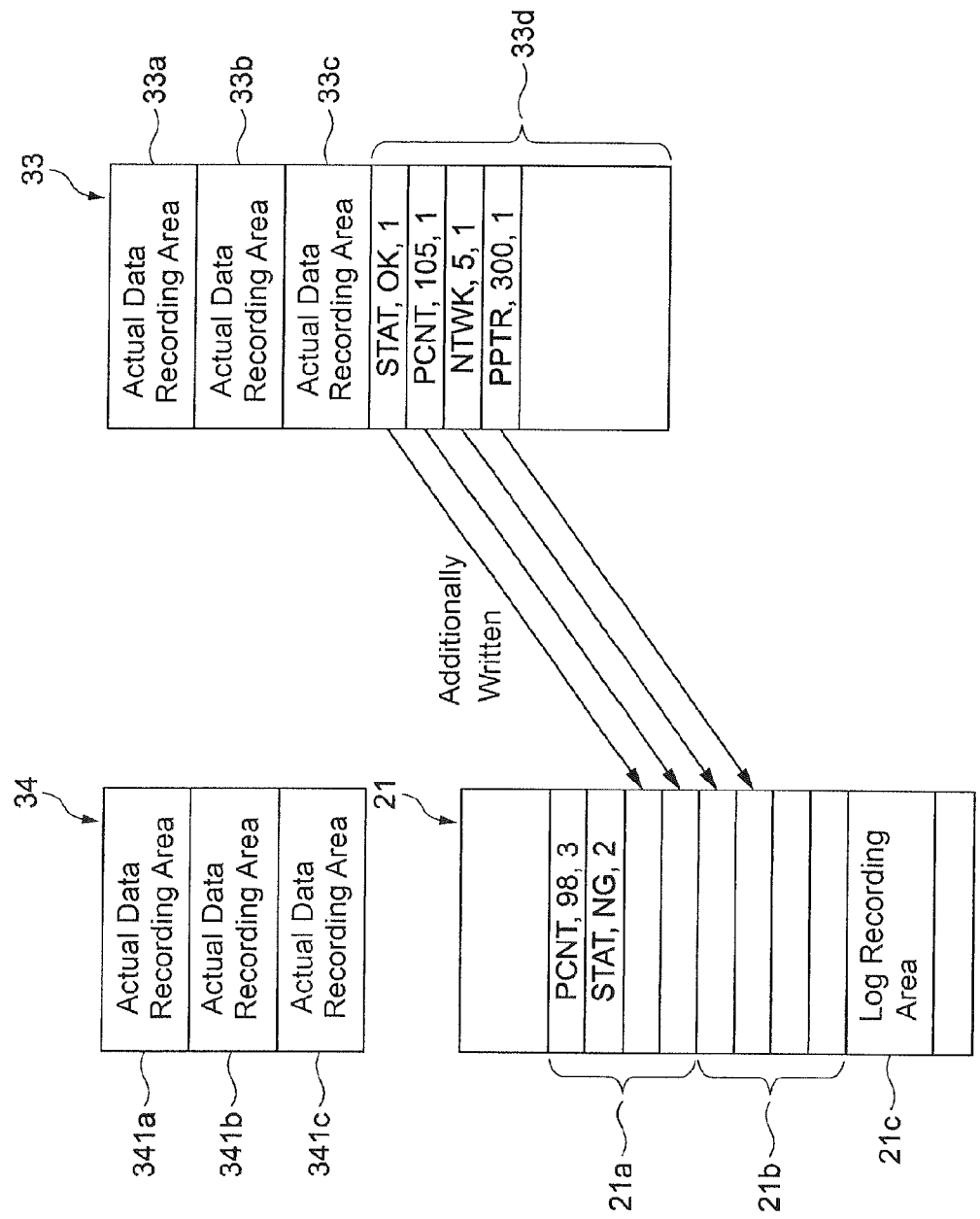
FIG. 13 illustrates a state where only a first log recording area is insufficient; therefore, the update information is also additionally written to a second log recording area.

For example, as illustrated in FIG. 13, assume that the log recording areas 21a, 21b, and 21c in the storage unit 21 each have capacities to record four pieces of update information. Then, assume that, at the write timing at this time, the writing starts from the first log recording area 21a. Assume that, to the log recording area 21a, the previously written update information has already been written across two entries. Empty entries to which the update information can be additionally written are only two.

In this state, when four pieces of the update information is additionally written from the log recording area 33d on the RAM 33, the first log recording area 21a is not enough. The update information is also additionally written to the second log recording area 21b.

The control unit 11 of the image forming apparatus 10a of the second embodiment does not additionally write the update information on the RAM 33 to the log recording area in the storage unit 21 simply. The control unit 11 once reads the update information already written to the log recording area in the storage unit 21 to which the update information will be written from now. When the update information with data ID identical to the read update information is present, the already-existing update information is overwritten by the identical update information.

Figure 14:
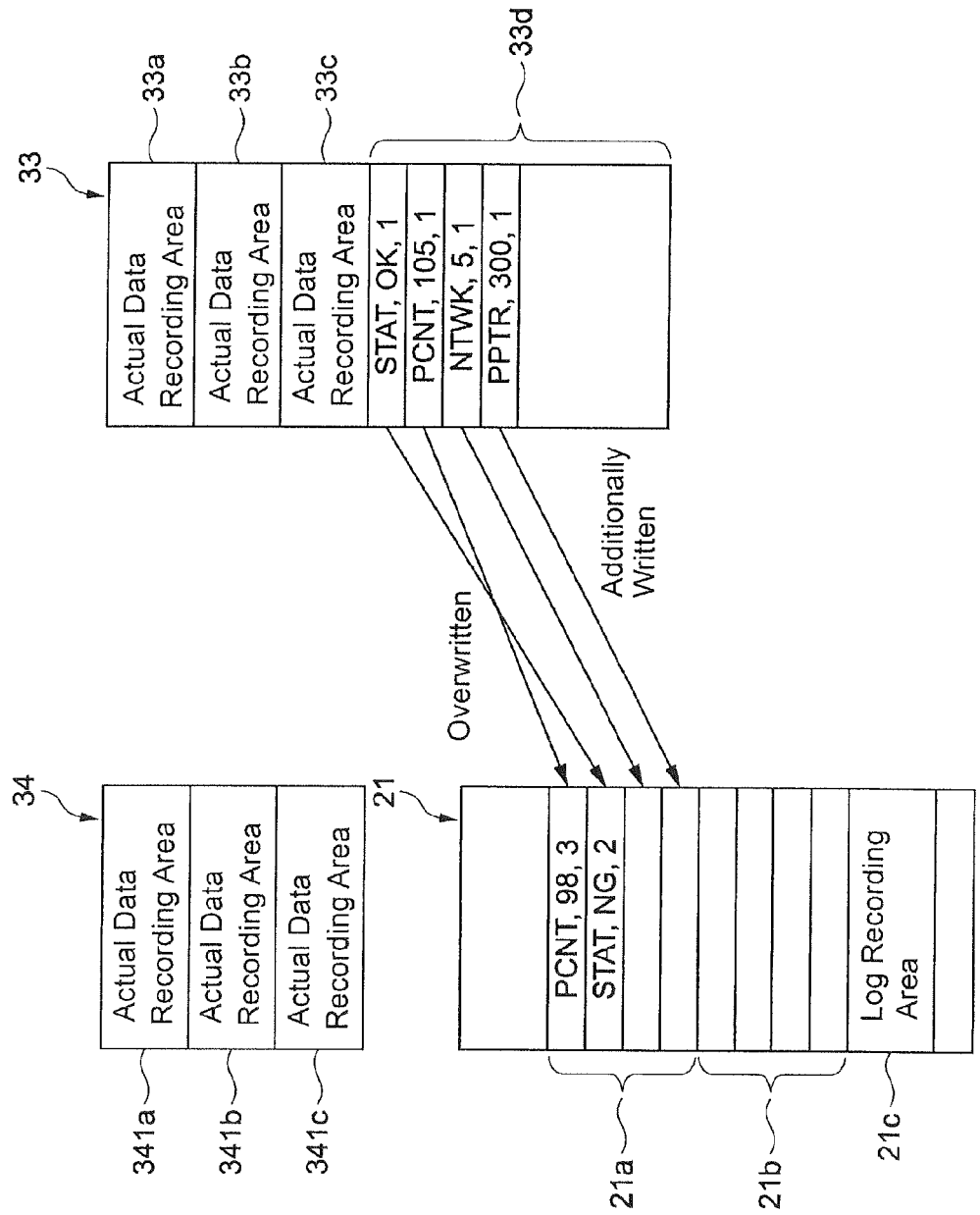
FIG. 14 illustrates a state where update information with matched data ID is overwritten.

For example, assume the example identical to the one illustrated in FIG. 13. As illustrated in FIG. 14, regarding the actual data, "STAT" and "PCNT", where the data IDs match between the update information to be written and the already-existing update information, the already-existing update information is not additionally written. The writing is performed in a manner of overwriting the already-existing old update information, "PCNT,98,3" and "STAT,NG,2."

Therefore, in this example, all the four pieces of update information in the log recording area 33d on the RAM 33 can be written to the first log recording area 21a. That is, the capacity of the area to which writing is performed can be reduced.

The second point that can be improved and the improvement method of the image forming apparatus 10 according to the first embodiment are described above.

For example, the disclosure can also be embodied using a NOR flash memory (registered trademark) and a NAND flash memory (registered trademark) as the non-volatile semiconductor memory.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable recording medium storing an information processing program for controlling an information processing device, the information processing program causing the information processing device to operate as:

a volatile memory that includes a first actual data area and a first log area, the first actual data area recording actual data, the first log area recording update information including update data, the update data being for updating the actual data recorded in the first actual data area;

a non-volatile semiconductor memory that includes a plurality of blocks and a second actual data area, at writing of the actual data, the non-volatile semiconductor memory being initialized in units of the blocks, the second actual data area recording the actual data in units of the blocks;

a storage circuit that includes a second log area to which the update information recorded in the first log area is wrote; and a processor that (i) records corresponding update information in the first log area when updating the actual data in the first actual data area by the update data, (ii) collects the update information recorded in the first log area at a specific timing, (iii) writes the collected update information to the second log area, (iv) after writing the collected update information, initializes the first log area, (v) when the second log area becomes full and a timing at which a batch-write instruction is executed at shut down of the information processing device, and when starting the information processing device, the processor writes the actual data in the second actual data area to the corresponding first log area and overwrites the update information in the second log area with the actual data that is written to the first actual data area.

2. An information processing device, comprising:

a volatile memory that includes a first actual data area and a first log area, the first actual data area recording actual data, the first log area recording update information including update data, the update data being for updating the actual data recorded in the first actual data area;

a non-volatile semiconductor memory that includes a plurality of blocks and a second actual data area, at writing of the actual data, the non-volatile semiconductor memory being initialized in units of the blocks, the second actual data area recording the actual data in units of the blocks;

a storage circuit that includes a second log area to which the update information recorded in the first log area is wrote; and a processor that (i) records corresponding update information in the first log area when updating the actual data in the first actual data area by the update data, (ii) collects the update information recorded in the first log area at a specific timing, (iii) writes the collected update information to the second log area, (iv) after writing the collected update information, initializes the first log area, (v) when the second log area becomes full and a timing at which a batch-write instruction is executed at shut down of the information processing device, and when starting the information processing device, the processor writes the actual data in the second actual data area to the corresponding first log area and overwrites the update information in the second log area with the actual data that is written to the first actual data area.

3. The information processing device according to claim 2, wherein the update information includes a data identifier for identifying the actual data to be updated, and when collecting the update information, the processor extracts only latest update information for each data identifier as the update information to be collected.

4. The information processing device according to claim 2, wherein the update information includes a data identifier for identifying the actual data to be updated, and to write the collected update information to the second log area of a plurality of pages, when a data identifier included in the update information to be wrote matches a data identifier included in the update information already recorded in the second log area on which the update information is to be wrote, the processor overwrites the update information including the matched data identifier already recorded in the second log area with the update information including the matched data identifier to be wrote.

5. The information processing device according to claim 2, wherein the storage circuit is a hard disk drive.

* * * * *